United States Patent
Park et al.

(10) Patent No.: US 7,539,103 B2
(45) Date of Patent: May 26, 2009

(54) METHOD FOR REAL TIME RECORDING/PLAYBACK OF DATA TO/FROM AND OPTICAL RECORDING MEDIUM AND METHOD FOR MANAGING FILES THEREOF

(75) Inventors: Yong Cheol Park, Kyonggi-do (KR); Kyu Hwa Jeong, Kyonggi-do (KR); Jong In Shin, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/790,858

(22) Filed: Apr. 27, 2007

(65) Prior Publication Data

US 2007/0263509 A1    Nov. 15, 2007

Related U.S. Application Data

(63) Continuation of application No. 10/613,090, filed on Jul. 7, 2003, now Pat. No. 7,218,592, which is a continuation of application No. 09/362,375, filed on Jul. 28, 1999, now Pat. No. 6,625,094.

(30) Foreign Application Priority Data

| Jul. 29, 1998 | (KR) | ................. | 98/30607 |
| Aug. 4, 1998 | (KR) | ................. | 98/31783 |
| Aug. 17, 1998 | (KR) | ................. | 98/33312 |
| Aug. 26, 1998 | (KR) | ................. | 98/34724 |

(51) Int. Cl.
*G11B 27/36* (2006.01)

(52) U.S. Cl. ................. 369/53.17; 369/47.14

(58) Field of Classification Search ............. 369/53.16, 369/53.17, 53.15, 53.31, 53.35, 53.36, 47.14
See application file for complete search history.

(56) References Cited

U.S. PATENT DOCUMENTS

| 4,308,935 A | 1/1982 | Deric |
| 4,406,000 A | 9/1983 | Shoji et al. |
| 4,774,700 A | 9/1988 | Satoh et al. |
| 4,833,665 A | 5/1989 | Tokumitsu et al. |

(Continued)

FOREIGN PATENT DOCUMENTS

CN    1164091 A    11/1997

(Continued)

*Primary Examiner*—Thang V Tran
(74) *Attorney, Agent, or Firm*—Birch, Stewart, Kolasch & Birch, LLP

(57) ABSTRACT

A method for real time recording and playback of data to and from an optical recording medium, and a method for managing a file thereof is disclosed. In the present invention, the host controls real time data writing by providing a signal requesting for information on a defective area to the device for recording/playback of data to/from an optical disk before providing a write command. Accordingly, the write command is generated such that data is not written on the defective areas, based upon the returned information on the defective area. Alternatively, the host may first provide a write command to the device for recording/playback of data to/from an optical disk, upon which information on defective areas is returned. Thus, the host generates and provides a new write command such that data is not written on a defective area based upon the returned information on the defective area.

19 Claims, 17 Drawing Sheets

U.S. PATENT DOCUMENTS

| | | | |
|---|---|---|---|
| 4,949,326 A | 8/1990 | Takagi et al. | |
| 4,972,398 A | 11/1990 | Wachi | |
| 5,075,804 A | 12/1991 | Deyring | |
| 5,111,444 A | 5/1992 | Fukushima et al. | |
| 5,212,676 A | 5/1993 | Yamabata et al. | |
| 5,237,553 A | 8/1993 | Fukushima et al. | |
| 5,241,531 A | 8/1993 | Ohno et al. | |
| 5,270,877 A | 12/1993 | Fukushima et al. | |
| 5,271,018 A | 12/1993 | Chan | |
| 5,283,790 A | 2/1994 | Kawashita | |
| 5,303,219 A | 4/1994 | Kulakowski et al. | |
| 5,404,357 A | 4/1995 | Ito et al. | |
| 5,412,629 A | 5/1995 | Shirane | |
| 5,442,614 A | 8/1995 | Tamegai | |
| 5,504,868 A | 4/1996 | Krakirian | |
| 5,508,989 A | 4/1996 | Funahashi et al. | |
| 5,526,335 A | 6/1996 | Tamegai | |
| 5,528,571 A | 6/1996 | Funahashi et al. | |
| 5,541,903 A | 7/1996 | Funahashi et al. | |
| 5,553,045 A | 9/1996 | Obata | |
| 5,590,349 A | 12/1996 | Robinson et al. | |
| 5,623,470 A | 4/1997 | Asthana et al. | |
| 5,666,335 A | 9/1997 | Horibe | |
| 5,715,221 A | 2/1998 | Ito et al. | |
| 5,721,726 A | 2/1998 | Kurnick et al. | |
| 5,737,290 A | 4/1998 | Ohmori | |
| 5,739,519 A | 4/1998 | Tsuchiya | |
| 5,740,349 A | 4/1998 | Hasbun et al. | |
| 5,745,444 A | 4/1998 | Ichikawa et al. | |
| 5,818,654 A | 10/1998 | Reddy et al. | |
| 5,841,748 A | 11/1998 | Yamamuro | |
| 5,848,438 A | 12/1998 | Nemazie et al. | |
| 5,859,823 A | 1/1999 | Yamamuro | |
| 5,883,867 A | 3/1999 | Yamamuro | |
| 5,896,364 A | 4/1999 | Okazaki et al. | |
| 5,914,928 A | 6/1999 | Takahashi | |
| 5,966,358 A | 10/1999 | Mine | |
| 5,999,505 A | 12/1999 | Yasui | |
| 6,025,966 A | 2/2000 | Nemazie et al. | |
| 6,031,804 A | 2/2000 | Yamamuro | |
| 6,038,209 A | 3/2000 | Satoh | |
| 6,049,515 A | 4/2000 | Yamamuro | |
| 6,094,317 A | 7/2000 | Chung | |
| 6,094,723 A | 7/2000 | Otsuka | |
| 6,160,778 A | 12/2000 | Ito et al. | |
| 6,212,647 B1 | 4/2001 | Sims, III et al. | |
| 6,272,085 B1 | 8/2001 | Maeda | |
| 6,279,118 B1 | 8/2001 | Kang | |
| 6,282,365 B1 | 8/2001 | Gotoh et al. | |
| 6,289,423 B1 | 9/2001 | Ozaki et al. | |
| 6,292,445 B1 | 9/2001 | Ito et al. | |
| 6,292,625 B1 | 9/2001 | Gotoh et al. | |
| 6,314,235 B1 | 11/2001 | Gotoh et al. | |
| 6,377,524 B1 | 4/2002 | Ko et al. | |
| 6,389,569 B1 | 5/2002 | Chung et al. | |
| 6,453,384 B1 | 9/2002 | Park et al. | |
| 6,480,446 B1 | 11/2002 | Ko | |
| 6,526,522 B1 | 2/2003 | Park et al. | |
| 6,631,106 B1 | 10/2003 | Numata et al. | |
| 6,782,488 B1 | 8/2004 | Park et al. | |
| 7,139,935 B2 | 11/2006 | Park et al. | |
| 7,146,527 B2 | 12/2006 | Park et al. | |
| 7,206,267 B2 | 4/2007 | Park et al. | |
| 7,218,592 B2 * | 5/2007 | Park et al. | 369/53.36 |
| 2001/0044873 A1 | 11/2001 | Wilson et al. | |
| 2003/0196133 A1 | 10/2003 | Park et al. | |
| 2003/0206721 A1 | 11/2003 | Gotoh et al. | |
| 2004/0153905 A1 | 8/2004 | Park et al. | |

FOREIGN PATENT DOCUMENTS

| | | |
|---|---|---|
| EP | 0 383 298 | 8/1990 |
| EP | 0 798 710 A2 | 10/1997 |
| EP | 0 837 472 A2 | 4/1998 |
| EP | 0 845 780 A1 | 6/1998 |
| EP | 0 559 468 A2 | 9/1998 |
| EP | 0 866 456 A1 | 9/1998 |
| EP | 0 952 573 A3 | 10/1999 |
| GB | 2 332 555 A | 6/1999 |
| JP | 2-23417 A | 1/1990 |
| JP | 2-139768 A | 5/1990 |
| JP | 4-28061 A | 1/1992 |
| JP | 04028061 A | 1/1992 |
| JP | 5-78109 A | 3/1993 |
| JP | 5-114247 A | 5/1993 |
| JP | 5-298836 A | 11/1993 |
| JP | 5-342759 A | 12/1993 |
| JP | 6-5001 A | 1/1994 |
| JP | 6-103577 A | 4/1994 |
| JP | 60-60550 A | 4/1994 |
| JP | 7-57397 A | 3/1995 |
| JP | 07-057398 | 3/1995 |
| JP | 7-254229 A | 3/1995 |
| JP | 7-262699 A | 10/1995 |
| JP | 8-171461 A | 7/1996 |
| JP | 8-212708 A | 8/1996 |
| JP | 8-249659 A | 9/1996 |
| JP | 9-231682 A | 9/1997 |
| JP | 9-259538 A | 10/1997 |
| JP | 9-259547 A | 10/1997 |
| JP | 9-282802 A | 10/1997 |
| JP | 10-027396 A | 1/1998 |
| JP | 10125006 | 5/1998 |
| JP | 10-172234 A | 6/1998 |
| WO | WO-97/07505 | 2/1997 |
| WO | WO-97/35309 A1 | 9/1997 |
| WO | WO-98/14938 | 4/1998 |

* cited by examiner

|  | starting sector address | sector number |
|---|---|---|
| file1 | A | N |

|  | starting sector address | number of sectors |
|---|---|---|
| first representing method for file 1 | A | N |
| second representing method for file 1 | A | N-L |

FIG.6B

| Byte \ Bit | 7 | 6 | 5 | 4 | 3 | 2 | 1 | 0 |
|---|---|---|---|---|---|---|---|---|
| 0 | Error Code(70h) ||||||||
| 1 | Reserved ||||||||
| 2 | ILI | Reserved ||| Sense Key ||||
| 3 | Information ||||||||
| 4 | |||||||||
| 5 | |||||||||
| 6 | |||||||||
| 7 | Additional Sense Length ||||||||
| 8 | reserved ||||||||
| 9 | reserved ||||||||
| 10 | |||||||||
| 11 | |||||||||
| 12 | Additional Sense Code ||||||||
| 13 | Additional Sense Code Qualifier ||||||||
| 14 | Field Replaceable Unit Code ||||||||
| 15 | LSN1 ||||||||
| 16 | |||||||||
| 17 | |||||||||
| 18 | LSN2 ||||||||
| 19 | |||||||||
| 20 | . . . ||||||||

FIG.6C

|  | starting sector address | number of sectors |
|---|---|---|
| file 1 | A | H |
|  | G | T |
|  | D | P |
|  | E | U |

FIG.8B

| Byte \ Bit | 7 | 6 | 5 | 4 | 3 | 2 | 1 | 0 |
|---|---|---|---|---|---|---|---|---|
| 0 | | | | Error Code(70h) | | | | |
| 1 | | | | Reserved | | | | |
| 2 | | | ILI | Reserved | | Sense Key | | |
| 3 | | | | Information | | | | |
| 4 | | | | | | | | |
| 5 | | | | | | | | |
| 6 | | | | | | | | |
| 7 | | | | Additional Sense Length | | | | |
| 8 | | | | listed sector number | | | | |
| 9 | | | | | | | | |
| 10 | | | | consecutive defective sector number | | | | |
| 11 | | | | | | | | |
| 12 | | | | Additional Sense Code | | | | |
| 13 | | | | Additional Sense Code Qualifier | | | | |
| 14 | | | | Field Replaceable Unit Code | | | | |

FIG.10B

|  | starting sector address | sector number |
|---|---|---|
| file 1 | A | M |
|  | D | P |
|  | E | Q + R + S |

METHOD FOR REAL TIME RECORDING/PLAYBACK OF DATA TO/FROM AND OPTICAL RECORDING MEDIUM AND METHOD FOR MANAGING FILES THEREOF

This application is a continuation of application Ser. No. 10/613,090 filed on Jul. 7, 2003 now U.S. Pat. No. 7,218,592, which is a continuation of application Ser. No. 09/362,375 filed Jul. 28, 1999 (now U.S. Pat. No. 6,625,094 issued Sep. 23, 2003). The entire contents of these applications are hereby incorporated by reference. Priority is claimed under 35 U.S.C. § 120; and this application claims priority of Application Nos. 30607/1998 filed in Korea on Jul. 29, 1998, 31783/1998 filed in Korea on Aug. 4, 1998, 33312/1998 filed in Korea on Aug. 17, 1998, and 34724/1998 filed in Korea on Aug. 26, 1998, under 35 U.S.C. § 119. This application also relates to U.S. application Ser. No. 10/896,984 (now U.S. Pat. No. 7,177,249 issued Feb. 13, 2007), which is another continuation of application Ser. No. 10/613, 090.

BACKGROUND OF THE INVENTION

1. Field of the Invention

The present invention relates to a rewritable optical recording medium and more particularly, to a method for real time recording/playback of data to/from an optical recording medium and a method for managing a file thereof.

2. Background of the Related Art

An optical recording medium includes a Read Only memory (ROM), a Write Once Read Many (WORM) time memory, and a rewritable memory which allows repeated writing. The ROM type of optical recording medium further includes a Compact Disc Read Only Memory (CD-ROM) and a Digital Versatile Disc Read Only Memory (DVD-ROM). The WORM type of optical recording medium further includes a Recordable Compact Disc (CD-R) and a Recordable Digital Versatile Disc (DVD-R). The rewritable type further includes a Rewritable Compact Disc (CD-RW) and a Rewritable Digital Versatile Disc (DVD-RW, DVD-RAM and DVD+RW).

For the rewritable optical recording mediums, the repeated recording and playback (R/P) of information to and from the rewritable optical recording medium changes an initial mixture ratio of a recording layer formed to write data on the optical disk. This change degrades performance of the optical recording medium, causing errors in R/P of the data information. A degraded region of an optical disk creates a defective area for formatting, writing to and playback from the optical recording medium. Moreover, a defective area in a rewritable optical recording medium can also be caused by scratches on the surface, dusts and defects in production.

To prevent R/P of data to/from a defective area formed by any of the above causes, management of the defective area is required. Thus, Defect Management Areas (DMAs) are provided in lead-in areas and in lead-out areas of the optical recording medium for managing defective regions of the optical recording medium, as shown in FIG. 1. Also, a data area is managed in groups, each having a user area for actual recording of data and a spare area for use in a case of defect in the user area.

Typically, one disc (e.g. DVD-RAM) has four DMAs, two in the lead-in area and two in the lead-out area. Since managing defect areas is important, the same data are held in all four DMAs, for data protection. Each DMA includes two blocks of 32 sectors, wherein one block consists of 16 sectors. The first block (DDS/PDL block) of each DMA includes a disc definition structure (DDS) and a primary defect list (PDL), and the second block (SDL block) includes a secondary defect list (SDL).

More specifically, the PDL represents a primary defect data storage area, and the SDL represents a secondary defect data storage area. The PDL stores entries of all defective sectors generated during manufacture and identified during formatting such as initialization or re-initialization. Each entry includes a sector number corresponding to a defective sector and an entry type.

On the other hand, the SDL is arranged by blocks and stores entries of either defective areas which may be generated after initialization, or defective areas which cannot be entered in the PDL during initialization. Each entry of the SDL includes an area storing the sector number of a first sector of the block having a defective sector, and an area holding the sector number of a first sector of an alternate block. Defective areas in the data area (i.e. defective sectors or defective blocks) are replaced with new sectors or blocks, respectively by slipping replacement or linear replacement.

The slipping replacement is utilized when a defective area or sector is listed in the PDL. As shown in FIG. 2A, if defective sectors m and n, corresponding to sectors in the user area, are recorded in the PDL, such defective sectors are replaced by the next available sector. By replacing the defective sectors by subsequent sectors, data is written to a normal sector. As a result, the user area into which data is written slips and occupies the spare area in the amount equivalent to the defective sectors.

The linear replacement is utilized when a defective area or block is recorded in the SDL. As shown in FIG. 2B, if defective sectors m and n, corresponding to sectors in either the user or spare area, are recorded on the SDL, such defective blocks are replaced by normal blocks in the spare area and the data to be recorded in the defective block are recorded in an assigned spare area. To achieve the replacement, a physical sector number (PSN) assigned to a defective block remains, while a logical sector number (LSN) is moved to the replacement block along with the data to be recorded. Linear replacement is effective for non real-time processing of data.

FIG. 3 is partial diagram of an optical disc recording/playback device relating to the write operation. The optical disc R/P device includes an optical pickup to write data into and playback data from the optical disc; a pickup controller transferring or moving the optical pickup; a data processor either processing and transferring the input data to the optical pickup, or receiving and processing the data reproduced through the optical pickup; an interface and a micro processor (micom) controlling the components.

Also, a host may be connected to the interface of the optical disc R/P device to transfer commands and data to and from the host and R/P device. Such a host can be any kind of personal computer, and would manage the optical disc R/P device.

Referring to FIG. 3, when data to be written is provided, the host provides a write command to the device for R/P of the data to/from an optical recording medium. The write command is inclusive of a Logical Block Address (LBA) which designates a writing position and a transfer length providing the size of the data. The host then provides the data to be written to the device for R/P of data to/from an optical recording medium. Upon reception of the data, the device for R/P of data writes the data starting from the designated LBA. At this time, the R/P device does not write data on defective areas, utilizing the PDL and the SDL which indicate defects on the optical recording medium.

Namely, the physical sectors listed on the PDL are skipped during the writing. As shown in FIG. 4A, physical blocks sb1kA and sb1kB listed on the SDL are replaced with replacement blocks sb1kC and sb1kD assigned to the spared area in the writing. Also, during the writing or playback of data, if a defective block not listed on the SDL or a block with a high possibility of error occurrence is present, the block is regarded as a defective block. Thus, a replacement sector block is located in the spare area, data of the defective block is written again into the replacement block, and a first sector number of the defective block and a first sector number of the replacement block are listed on the SDL entry.

Referring to FIG. 4A, for file 1, a conceptual expression of a portion representing a starting position and a size of file in an Information Control Block (ICB) having the file information written thereon in an Universal Disc Format (UDF) file may be shown as in FIG. 4B. As file 1 starts from position 'A', a defective block sb1kB in file 1 is replaced with a spare block sb1kD in the spare area. Thus, the number of logical sectors remains and a size of sector for file 1 is 'N'.

In order to write data by replacing defective blocks listed on the SDL with a replacement block assigned in the spare area, the optical pickup must be shifted to the spare area and returned back to the user area. However, the time period required for shifting and returning back interferes with a real time recording. Accordingly, many defective area management methods for real time recording are suggested. One of such methods is a skipping method in which the linear replacement is not performed when using the SDL, but data of an encountered defective block is written on a good block subsequent to the defective block as in the slipping replacement. As a result, the shifting time of the optical pickup in a real time recording can be reduced because the optical pickup is not required to shift to the spare area every time the optical pickup encounters a defective block.

At this time, the defective block retains the LSN and PSN. However, from the viewpoint of the host, the number of logical sectors in an optical disc is fixed,. Thus, skipping causes losses of LSN in view of the host, equivalent to the number of skipped blocks, because LSNs are allocated to the skipped defective blocks even if data is not written on the defective block. For example, even if data of 100 sectors are transmitted for writing from the host and if there is one defective block in the area, only 84 sectors (1 block =16 sectors) are written.

Therefore, for file 1 in FIG. 4C, the size can be represented as N or N-L, shown in FIG. 4D, in an ICB of a UDF file system. The 'L' denotes a number of defective sectors skipped in an area on which file 1 is written. As shown in FIG. 4C, data of file 1 is written from position 'A' for 'M' sectors until a defective block is encountered. The defective block is skipped, and the writing of file 1 is continued. However, since the defective block sb1kB retains the LSN without writing data on the defective block sb1kB, the optical disk R/P device writes data only on N-L sectors when the host provides a command to write data on N sectors, because the LSN of the defective block sb1kB cannot be used.

Consequently, if file 1 size is represented with 'N' as in the first case of FIG. 4D, an actual file size and a written file size differs, causing a problem in management of the file by a file manager. On the other hand, if the size of file 1 is represented with 'N-L' as in the second case, an inconsistency of the LSNs occurs. For example, if file 3 is newly written after file 2 in FIG. 4C has been erased, the file manager of the host would generate a command to write the data of file 3 starting from C-L position, where L is the number of sectors with defects.

As a result, data of file 1, previously written, would be damaged. Thus, when a real time data is written according to the aforementioned method, the file manager can make mistakes in the management of the files.

Also, the LSNs retained by the defective areas during a real time recording cannot be utilized and an amount of data corresponding to such LSNs cannot be recorded. Therefore, effectively, a reduction of the disk size occurs. This is because data is written in fixed units in response to write command from the host regardless of whether defective blocks or defective sectors exists in an area in which the data is written.

SUMMARY OF THE INVENTION

Accordingly, an object of the present invention is to solve at least the problems and disadvantages of the related art.

An object of the present invention is to provide a method for real time R/P of data to/from an optical recording medium, by providing a write command using information from a defective area returned from a device for R/P of data on an optical disk.

Another object of the present invention is to provide a method for real time management of files in an optical disk.

A further object of the present invention is to provide a method for managing files in an optical disk with the capability to manage real time data using defective block information.

A still further object of the present invention is to provide a method for managing files in an optical disk with the capability to manage real time data using skipped defective block information.

A still further object of the present invention is to provide a method for real time R/P of data on an optical recording medium, in which a device for R/P of data on an optical disk reads out and excludes defective areas before writing the data when a real time data is provided.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method for real time R/P of data to/from an optical recording medium includes (1) generating a control signal requesting information on a defective area if data to be written in real time is generated, and forwarding the control signal to the device for R/P of data to/from the optical medium; (2) providing the information on the defective area to the controller when the control signal is received; and (3) generating the write command such that data is not written on the defective area when the information on the defective area is returned in step (2), and providing the write command together with the data to be written in real time to the device for R/P of data to/from the optical medium.

More particularly, the information regarding the defective area which is returned to the controller may be positional information of the defective area listed on a defect management area. The information regarding the defective area returned to the controller may also be a positional information on a defective block listed on a secondary defect list. Such information may further includes a first sector number of each defective block. Moreover, such information regarding the defective area which is returned to the controller retains a logical sector number. Finally, the information regarding the defective area returned to the controller may be positional information on defective areas listed on a PDL and a SDL.

If a new defective block is encountered during the writing of data in response to a write command, the new defective block is skipped and the data is written on a good block subsequent the new defective block.

The above method may further include repeating the steps of terminating the write command and returning information regarding a new defective block to the controller; generating a new write command when such information is returned; and providing to the device for R/P of data to the optical disk every time a new defective block is encountered during writing the data in response to the write command. The above method may further include the step of writing the data on the defective block as is if a new defective block is encountered during writing the data in response to the write command.

In another aspect of the present invention, a method for managing data files recorded on an optical recording medium in a device for R/P of data to/from the optical medium for writing the data from a controller on the optical recording medium in response to a write command is provided. The method comprises (1) generating a control signal for requesting information on a defective area if data to be written in real time is generated, and forwarding the control signal to the device for R/P of data to/from the optical medium; (2) providing the information on the defective area to the controller when the control signal is received; (3) generating the write command such that data is not written on the defective area when the information on the defective area is returned in step (2) and providing the write command together with the data to be written in real time to the device for R/P of the data to/from the optical medium; and (4) writing information on a file architecture with reference to the information on the defective area on the optical recording medium when the real time data recording is completed in response to the write command.

The above method may further include terminating the write command if a new defective block is encountered during writing the data on the optical recording medium in response to the write command, and returning the information on the defective block to the controller; and generating a new write command when the information on the defective block is returned and providing the new write command to the device for R/P of data to an optical disk.

The information regarding the defective block which is returned to the controller may be a written sector number until the defective area is encountered since the writing is started in response to the write command and a consecutive defective sector number. The information regarding the defective block which is returned to the controller may be returned with the information on the defective block written on an unused area in request sense data.

If a new defective block is encountered during the writing of data on the optical recording medium in response to the write command, the above method may further include skipping the defective block and writing the data on a good block subsequent to the defective block, and returning the information on the skipped defective blocks to the controller if the write command provided from the controller is terminated during the foregoing step. The information on the skipped defective block may be returned with the information written on an additional area of the request sense data, and an added length is stored. An Information Control Block (ICB) written out for one file is separated by the returned defective area, and the defective area is not written on the ICB.

Still, in another aspect of the present invention, a method for real time R/P of data to/from an optical recording medium is provided, including the steps of (1) returning information on a defective block present in a writing area designated by the write command to the controller upon reception of the write command for making a real time recording from the controller; (2) generating a new write command and providing to the device for R/P of data to/from an optical disk when the information on the defective block is returned in the above step; and (3) writing the data in response to the write command provided in the above step. An ICB written out for one file is separated by the returned defective area when the writing for one file is finished in the above step, and the defective area is not written on the ICB.

In a still further aspect of the present invention, a method for managing files in a device for R/P of data on an optical recording medium for, if data to be written is generated, writing the data on the optical recording medium is provided, including the steps of (1) reading information on a defective area if data to be written in a real time is generated; (2) writing the data to be written in real time excluding the defective area read in step (1); and (3) writing file architecture on the optical recording medium with reference to the information on the defective area upon completion of writing of the data to be written in real time. The file architecture (ICB) written out for one file is separated by the defective area, and the defective area is not written on the file architecture (ICB).

BRIEF DESCRIPTION OF THE DRAWINGS

The invention will be described in detail with reference to the following drawings in which like reference numerals refer to like elements wherein:

FIG. 6B illustrates an architecture of a requesting sense data which returns defective information on an optical disk to a host in FIG. 5;

FIG. 6C illustrates a conceptual writing state of an UDF file system for a file shown in FIG. 6A;

FIG. 8B illustrates an architecture of a requesting sense data which returns defective information on an optical disk to a host in FIG. 7;

FIG. 10B illustrates a conceptual writing state of a UDF file system on a file in FIG. 10A;

DETAILED DESCRIPTION OF THE PREFERRED EMBODIMENTS

Reference will now be made in detail to the preferred embodiments of the present invention, examples of which are illustrated in the accompanying drawings.

In a first embodiment of the present invention, if a data for a real time writing is provided, a host provides, in advance, a signal requesting information regarding defective areas to a device for R/P of data to/from an optical disk. The host generates a write command using the information on the defective area returned from the R/P device to write the data. In a second embodiment of the present invention, if a data for real time writing is provided, the host provides in advance, a command for real time recording. The host then provides a new write command when information on defective area within blocks corresponding to the command is returned from the R/P device to write the data.

The present invention further includes methods to process a newly encountered defective block during writing of data. In one method, the defective block is skipped and data is written on a good block subsequent the defective block. Another method terminates a write command if a new defective block is encountered and receives a new write command for continuation of data writing from the host. Also, a further method writes data on the defective block as is. Such methods for processing a newly encountered defective block is applicable both to the first and second embodiments of the present invention. The first and second embodiments will next be explained.

First Embodiment

Figure 1:
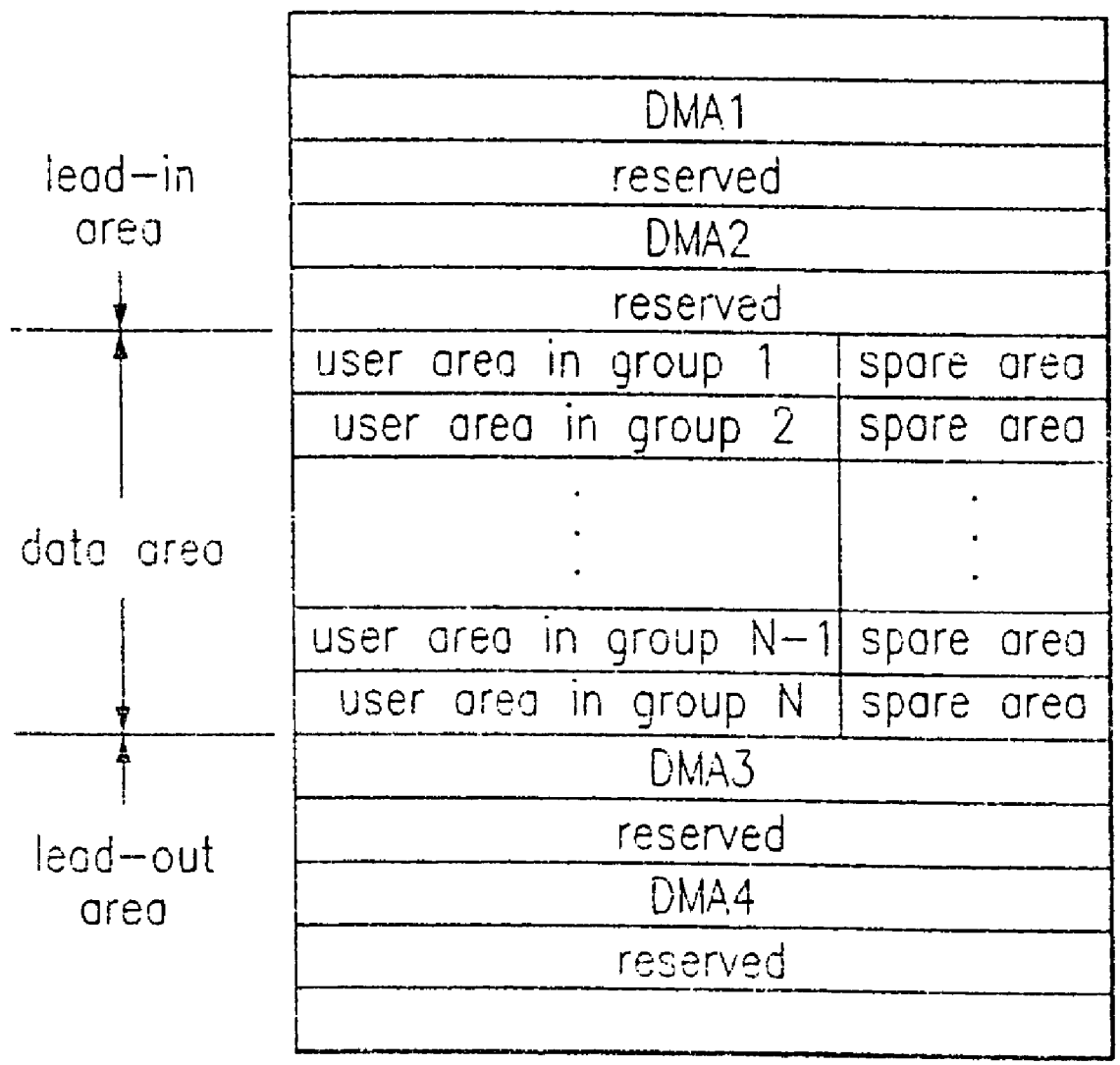
FIG. 1 illustrates an architecture of a rewritable optical disk in the related art.
Figure 2A:
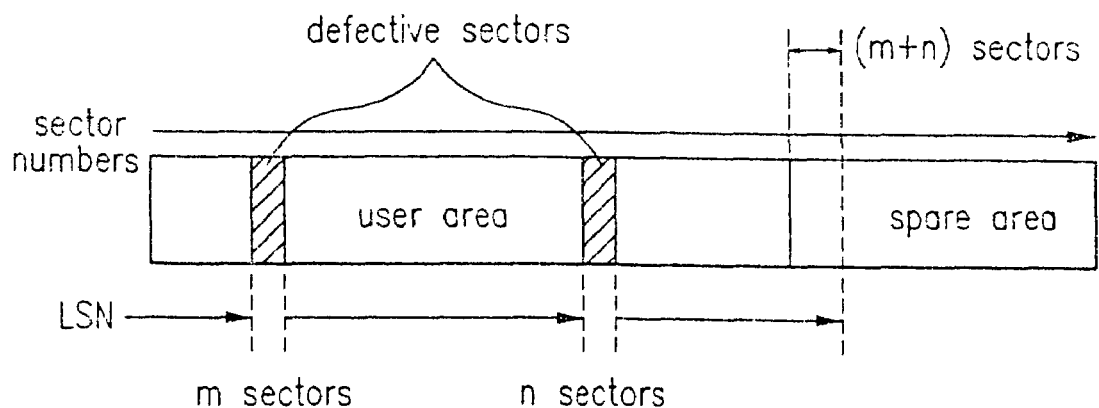
FIG. 2A illustrates a slipping replacement in the related art.
Figure 2B:
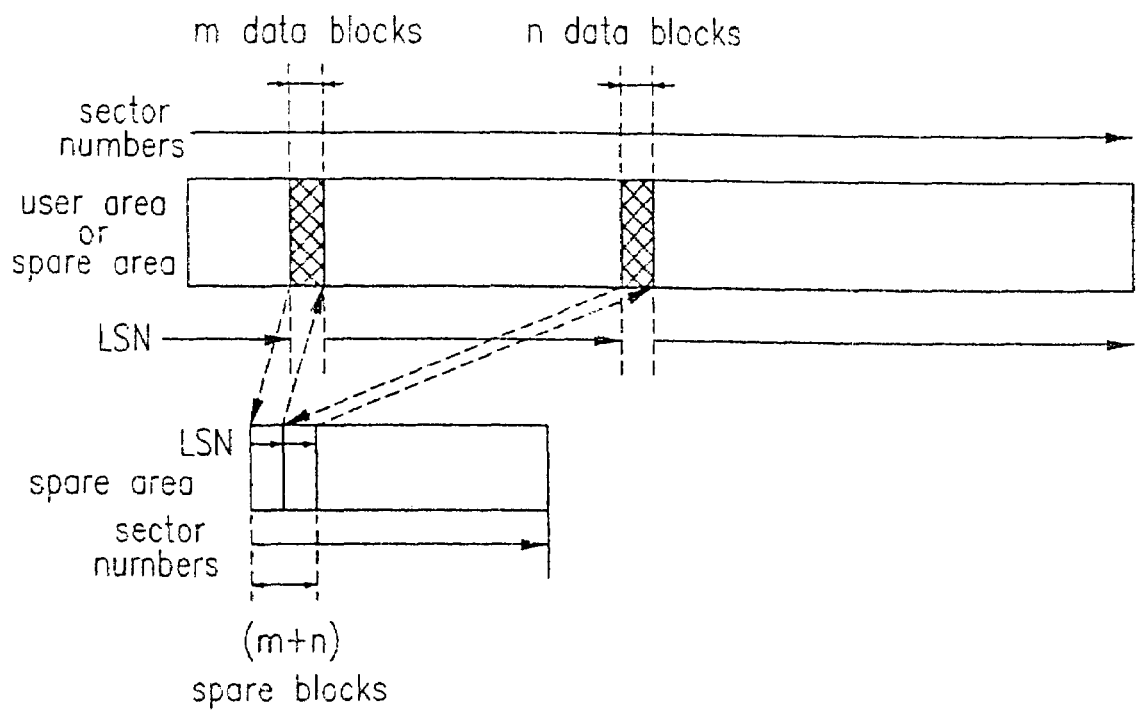
FIG. 2B illustrates a linear replacement in the related art.
Figure 3:
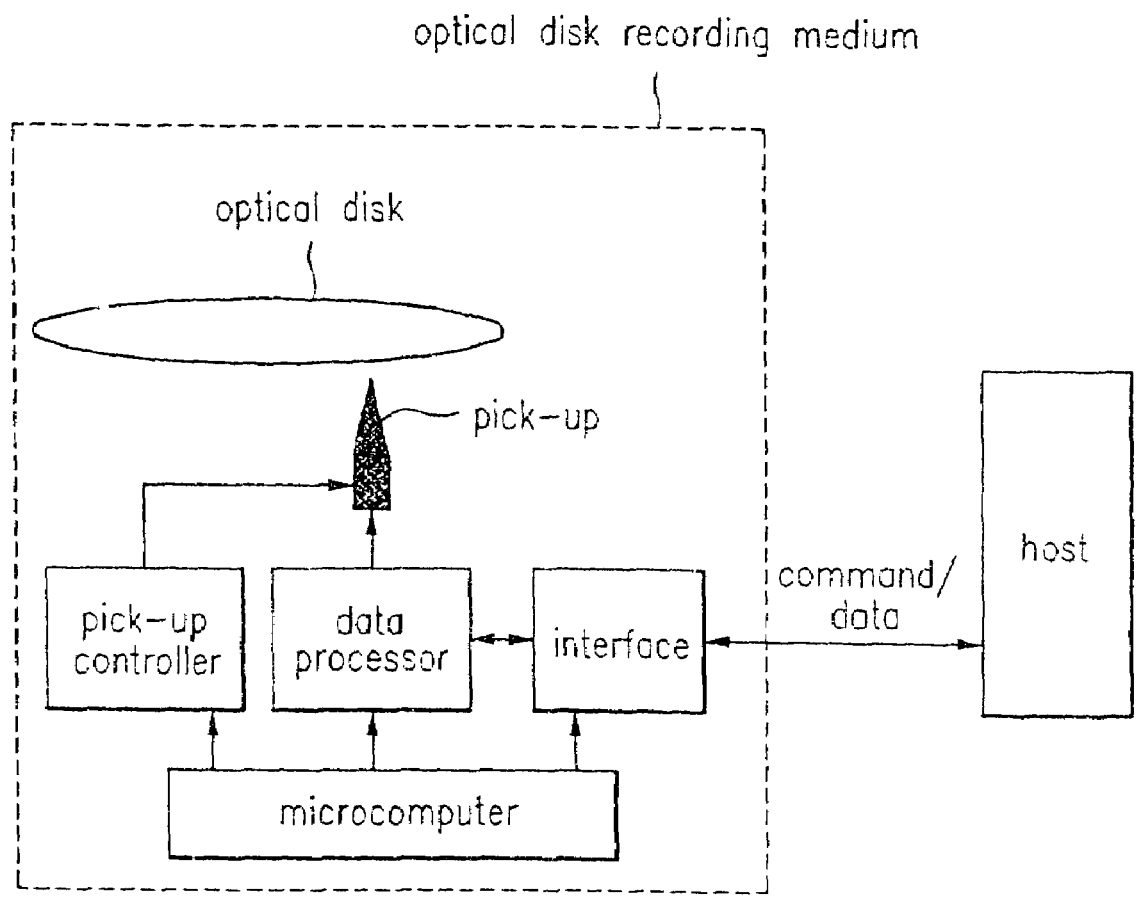
FIG. 3 illustrates a block diagram of a device for R/P of data on an optical disk in the related art.
Figures 4A, 4B:
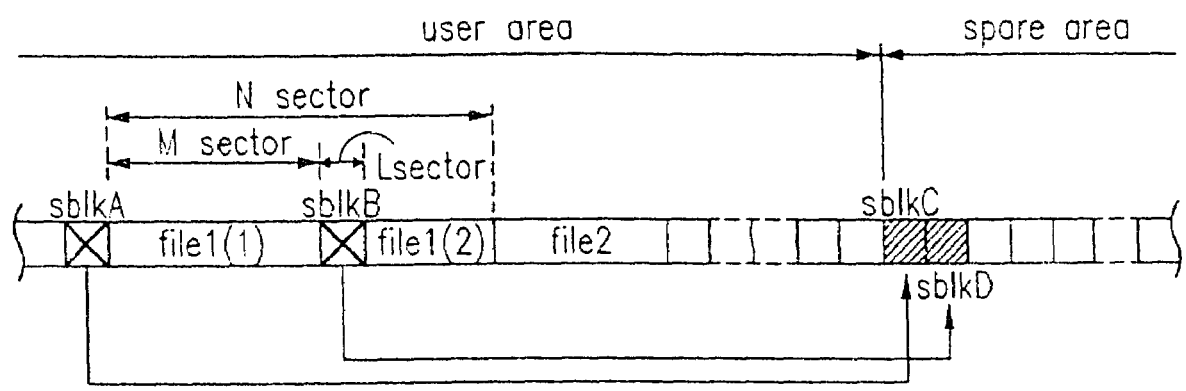
FIG. 4A illustrates a state when writing data on an optical by a linear replacement when a SDL is used.
FIG. 4B illustrates a conceptual writing state of a UDF file system for a file shown in FIG. 4A.
Figures 4C, 4D:
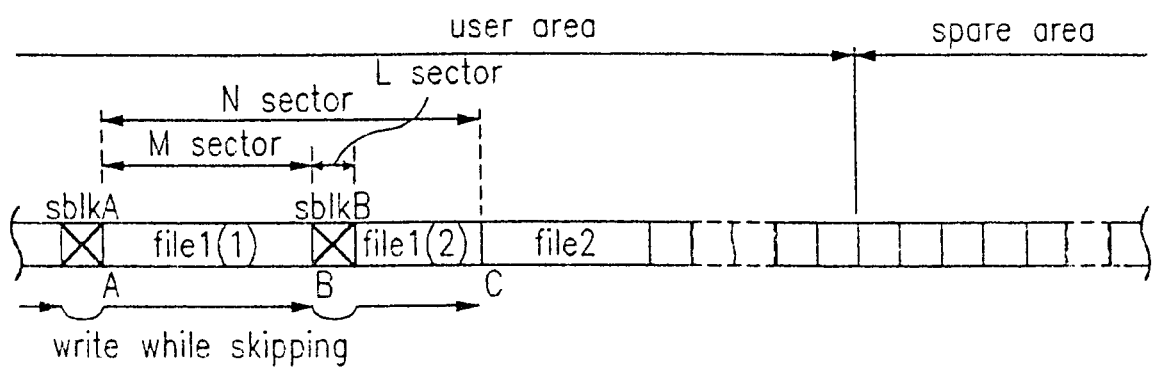
FIG. 4C illustrates a state when writing data on as optical disk by skipping when an SDL is used.
FIG. 4D illustrates a conceptual writing state of an UDF file system for a file shown in FIG. 4C.
Figure 5:
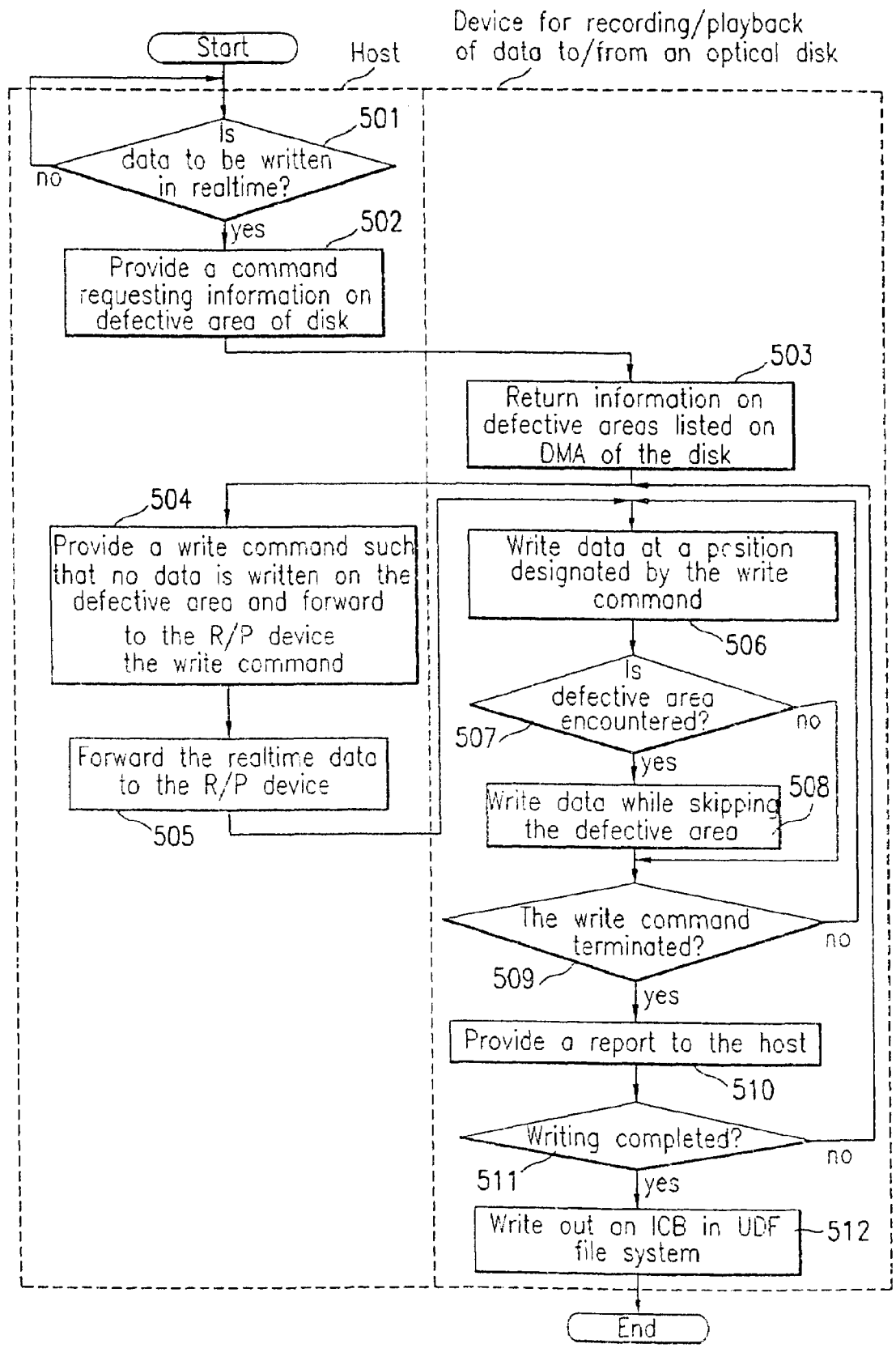
FIG. 5 is a flow chart showing skipping a defective block newly encountered in a method for real time R/P of data to/from an optical medium and a method for managing files in accordance with a first embodiment of the present invention.

FIG. 5 is a flowchart showing a method for real time R/P of data to/from an optical medium and a method for managing files in accordance with a first preferred embodiment of the present invention.

When data for real time recordation is provided (step 501), the host provides a control signal requesting information on defective areas of the disk to the device for R/P of data in/from an optical disk before the host provides a write command (step 502). As a supplementary signal, the control signal requesting information on defective areas may or may not be provided in a similar manner to a command type for returning the PDL information.

Figure 6A:
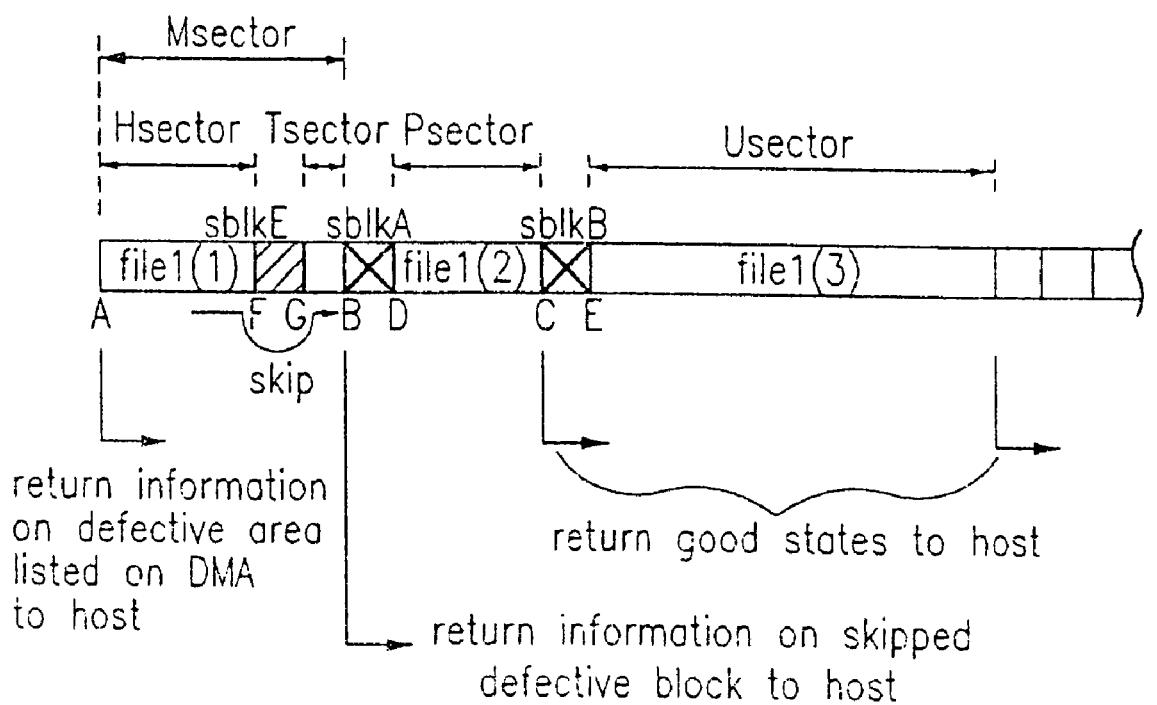
FIG. 6A illustrates a state in which information on a defective block is provided to the host once a write command is finished after a newly encountered defective block is skipped in FIG. 5.

Upon reception of the control signal from the host, the R/P device returns the information on the defective area listed on a DMA (step 503). The information on the defective area returned to the host may be a positional information of the defective blocks and defective sectors listed on the SDL and PDL, or may be positional information of defective blocks listed on the SDL. As shown in FIG. 6A, blocks sb1kA and sb1kB are the defective blocks listed in the SDL and the positional information of such defective blocks are returned to the host by the microcomputer.

The microcomputer may convert the PSN of the first sector of the defective block listed on the SDL to a LSN for use as the positional information of the defective blocks. In this case, the LSN returned to the host and 15 subsequent sectors are determined to be defective. Also, by setting a predetermined signal, information on defective areas can be returned to the host when the host provides the predetermined signal to the R/P device, even if a real time writing is not being performed.

The host generates a write command with reference to the returned information on the defective area and to an existing file architecture. The write command is forwarded to the R/P device together with real time data (step 504 and 505). Namely, the host generates the write command such that data is not written on either defective areas listed on the SDL nor on newly encountered defective areas.

Referring to FIG. 6A for example, if information on defective areas of a disk is returned to the host at position 'A' in response to a request from the host, the host has knowledge of the defective areas. Accordingly, the host can provide relevant data to the R/P device together with a command for writing the data in the next 'M' sectors starting from position 'A'. The R/P device then begins to write the data starting from position 'A' as indicated by the write command (step 506). At this time, the write command may be a command designating in advance a position at which the data is to be written or a write command inclusive of a position to be designated.

Figure 8A:
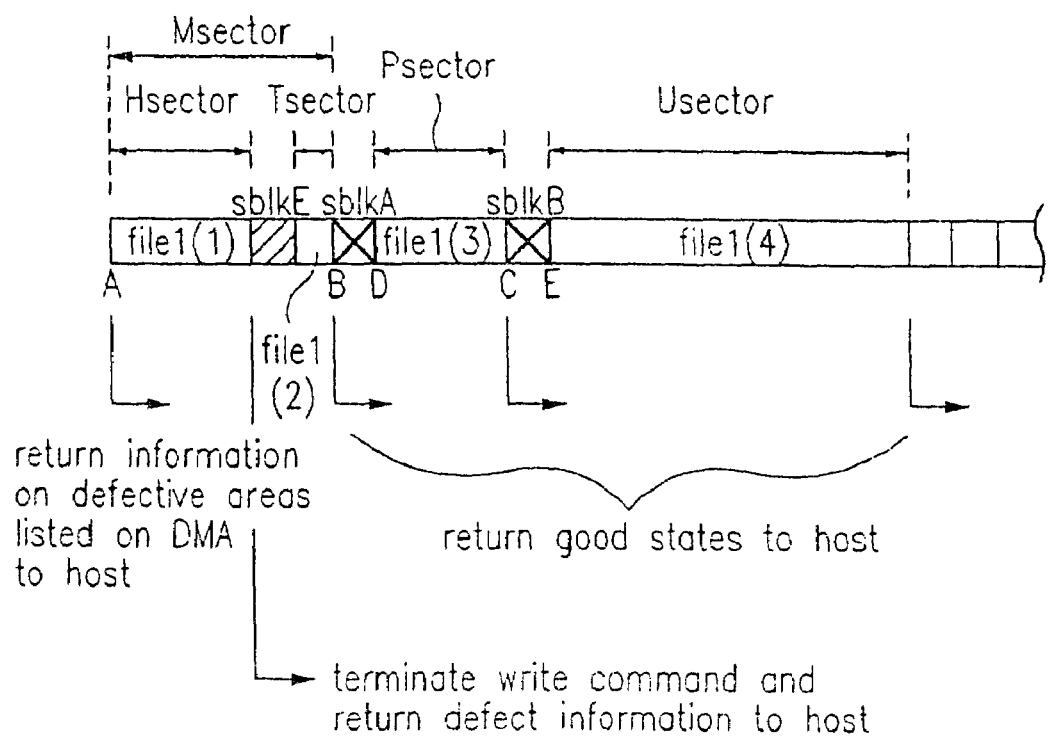
FIG. 8A illustrates a state in which a write command is ended and information on a defective block is provided to a host when a new defective block is encountered in FIG. 7.
Figure 10A:
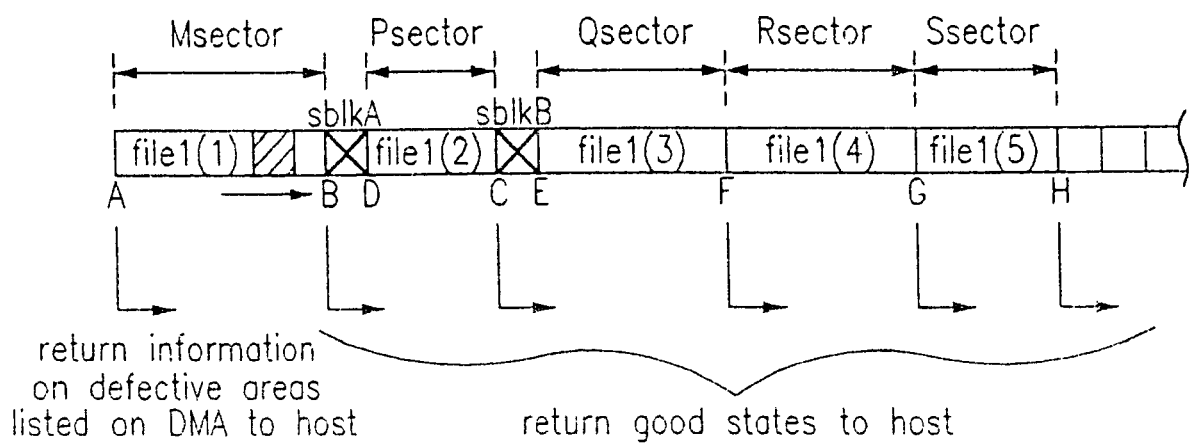
FIG. 10A illustrates a state in which a data is written by a method for real time recording a data in FIG. 9.

If a defective block with a high possibility of errors is found, even if the defective block is not listed on the SDL, the new defective block may be skipped and the data would be written on a good block subsequent the defective block. Alternatively, as shown in FIG. 8A, the write command may be terminated upon finding a new defective block and a new write command would be received from the host to write the data. Finally, the data may also be simply written on the new defective block as is upon finding a new defective block upon finding a new defective block, as shown in FIG. 10A.

For example, when a new defective block, especially with a Physical Identification (PID) error, is encountered, the block may be skipped without writing the data therein, as shown in FIGS. 6A and 8A, provided that the time period for forming a new EEC block is sufficient. However, if the time period for forming a new EEC block is insufficient, the data would be written on the defective block as is, as shown in FIG. 10A.

FIGS. 5 and 6 illustrate examples of skipping a newly encountered defective block and writing the data on a good block, subsequent the new defective block. Particularly, if a new defective block is encountered during the data writing at positions designated by the write command (step 507), the microcomputer skips the block and writes the data on a next available good block subsequent the skipped block (step 508). Thereafter, the microcomputer determines whether the write command from the host has been terminated (step 509). If the write command has not been terminated, the process returns to step 506 to conduct the process for checking defective blocks while writing the data at positions designated by the write command. If the write command has terminated, the information of the defective blocks skipped during the write command is returned to the host (step 510). In step 510, if there is no defective block, information representing a good state is returned to the host.

Also, by a predetermined protocol or signal rather than a command, the host may make requests for the present status of writing during the writing of data. Thus, upon the generating of the signal, the R/P device would provide the requested information to the host. If there is no protocol, the information on the writing is provided to the host after the write command is finished.

The information on the defective block may be returned to the host in one of various methods. In one method, the information is returned utilizing a request sense data as shown in FIG. 6B. When the write command is finished, the microcomputer returns a command execution report to the host. At this time, the information on the skipped defective blocks returned by recording the information into a supplemental area of the request sense data.

For example, the R/P device writes the data in real time according to a write command from the host by a skipping method, as shown in FIG. 6A, until the write command terminates. At such time, the R/P device a check condition status (CHECK CONDITION status) indicating the presence of errors and the like to the host. Upon reception of the check condition status, the host forwards the request sense command to the R/P device to request for an error code. Thus, the R/P device returns the request sense data to the host, as shown in FIG. 6B.

Namely, the information on skipped defective blocks is written starting from the 15th byte in an additional area of the request sense data and returned to the host. This is possible because a byte length of the request sense data is variable and an additional length due to the addition of the information may be written on a 7th byte additional sense length. Accordingly, the present invention utilizes, but maintains the existing request sense data to return the information on defective areas.

Because the R/P device returns information on defective blocks skipped during the execution of the command to the host each time a write command terminates, the number of the skipped blocks varies. Therefore, starting from the 15th byte, the information may be written on the request sense data in units of three or four bytes. Also, the information on each defective block written on the request sense data includes an LSN of the first sector in a skipped block. If two defective blocks are found during the execution of one write command, two LSNs are written on the additional area of the request sense data and returned to the host. The host then regards the LSN returned to the host and the 15 sectors thereafter as defective.

Referring back to FIG. 5, after the R/P device provides a report to the host, a determination is made whether writing of a file has completed (step 511). If the writing is not completed, the process proceeds to the step 504 and a new write command is provided to complete the writing of the file.

As shown in FIG. 6A, if the second write command begins at position 'B', the host already has knowledge of the information on the defective blocks sb1kA and sb1kB listed on the SDL. Thus, the host provides the write command such that data is not written on the defective sectors sb1kA and sb1kB. For example, a write command which writes data for P sectors starting from position 'D' and excluding the defective block sb1kA may be provided together with the data to be written. At this time, the write command may be a command for writing data starting from the 'D' position for P sectors or a command for writing data starting from any empty area of an existing file. Nevertheless, the write command excludes the defective area, resulting in a fragmentation of the write command due to the defective area.

Accordingly, the host may have to generate and provide numerous write commands to complete writing one file. However, even if the write command is divided by the defective area, the present invention can easily be incorporated into the existing system without significant changes. The microcomputer provides a command execution report to the host each time a write command is completed according to the aforementioned process. Most of such a report would include information representing good states because the write command is provided from the host, excluding the defective areas.

Upon completion of the writing of the file, the host writes an ICB, as shown in FIG. 6C, representing a starting position and a size of a file in an UDF file system on an optical disk (step 512) with reference to the positional information on the returned defective areas. If file 1 in FIG. 6A is taken as an example, file 1 is written starting from position 'A' for H number of sectors where a new defective block is encountered. The new defective block is skipped and file 1 is written starting from position 'G' for T number of sectors. Writing of file 1 would be completed after writing file 1 from position 'D' for P number of sectors, and from position 'E' for U number sectors by providing, in advance, information on the defective blocks sb1kA and sb1kB listed on the SDL.

Eventually, an ICB of file 1 is made divided into a subfile having a starting position 'A' and a size H, a subfile having a starting position 'G' and a size T, a subfile having a starting position 'D' and a size P, and a subfile having a starting position 'E' and a size U. Namely, the defective areas sb1kA, sb1kB, sb1kE present in the writing area of file 1 are not written on the ICB. As a result, inconsistencies between the size of a written file and the size of an actual file and inconsistencies of the LSNs due to defective regions do not occur. As a result, mistakes made by the file manager due to such inconsistencies are also eliminated.

Moreover, such ICB can be made while maintaining the existing UDF file system. Even in the existing system, one file is often written by shifting to empty areas rather than in succession, resulting in a fragmentation of the file. Similarly, the ICB simply fragmentizes one file. The present invention regards the defective areas as skipped areas caused by shifting of areas in making the ICB, thereby creating no conflicts with an existing file system. Also, as the defective areas maintain the LSN without being written on the ICB, the defective area can be used during writing by linear replacement. By replacing the defective blocks encountered during writing with a spare block in the spare area, linear replacement allows use of the whole user area of the disk. Thus, utilization efficiency of the disk can be improved. Since the host receives information on defects of the disk during a state in which a disk architecture is not known in making a real time recording control, a load on the host can be reduced.

Figure 7:
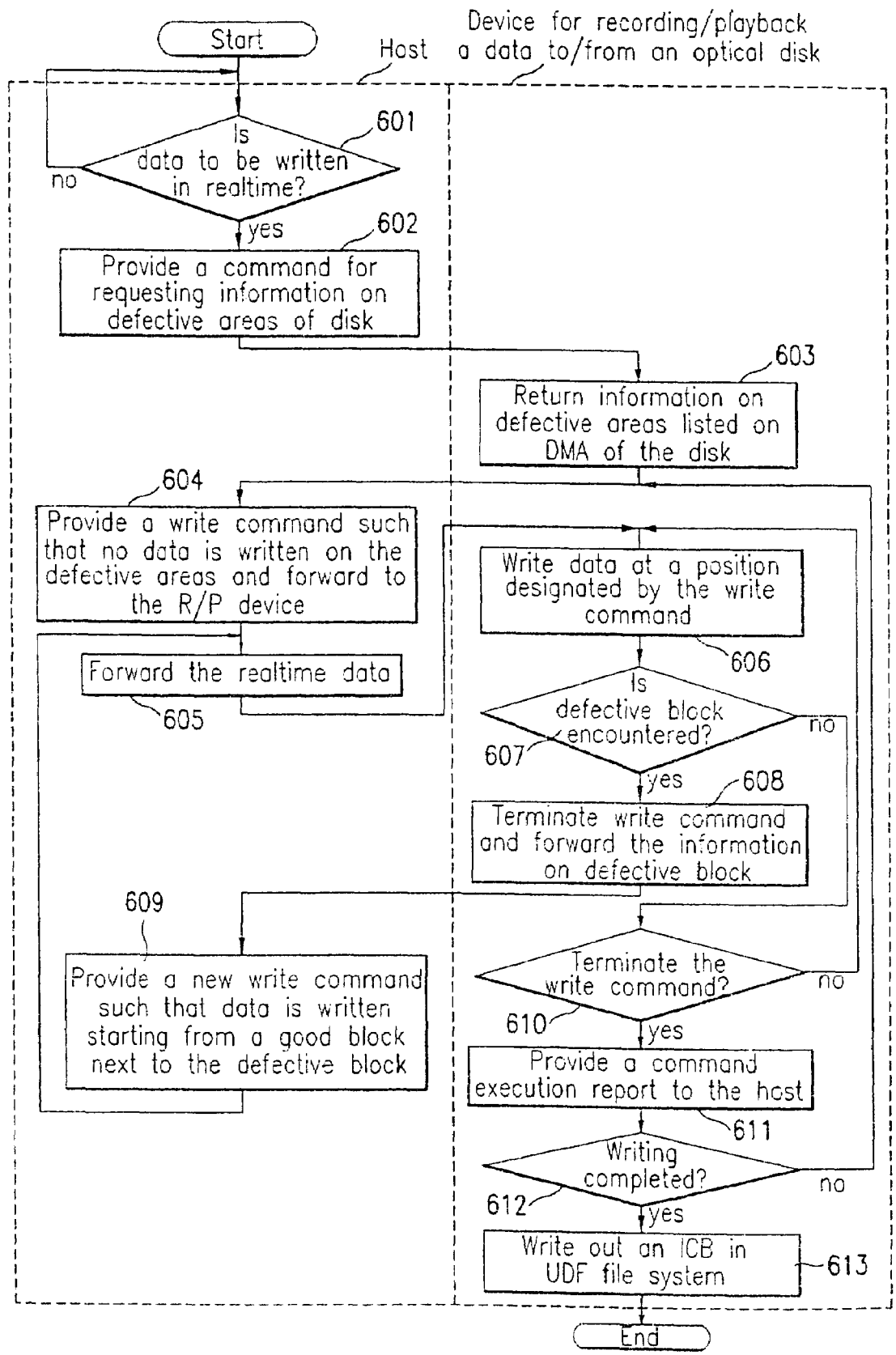
FIG. 7 is an another flow chart showing skipping a defective block newly encountered in a method for real time R/P of data to/from an optical medium and a method for managing files in accordance with a first embodiment of the present invention.

FIG. 7 is a flowchart showing another method for real time R/P of data to/from an optical medium by skipping a newly encountered defective block not listed on the SDL during writing in response to a write command. Explanations of steps 601 to 606 will be omitted as the steps are identical to the steps 501 to 506 in FIG. 5.

Referring to FIG. 8A, when a defective block with a high possibility of error is encountered during writing of data at a position designated by a write command (step 607), the microcomputer forcibly stops the write command and returns information on the defective block to the host (step 608). Upon reception of the information on the defective block, the host provides a new command such that data can be written starting from a next good block subsequent the defective block (step 609). Upon reception of the new command for writing, the R/P device writes the data at a position the command designates, i.e. on a good block.

The information on defective area may be provided to the host in a variety of methods, one of which is by using a request sense data, as shown in FIG. 8B. For example, the R/P device continues writing a real time data starting from position 'A' for H number of sectors, as shown in FIG. 8A, until a defective block sb1kE is encountered. At such time, the device returns a check condition status (CHECK CONDITION status) to the host. Upon reception of the check condition status, the host forwards the request sense command to the R/P device to request for an error code. Thus, the R/P device returns the request sense data to the host, as shown in FIG. 6B.

The request sense data has 15 bytes, of which the 8th, 9th, 10th and 11th bytes are reserved for use in transmission of the defect information. Since the R/P device stops the write command and returns to the host the information on defective area each time a defective block is encountered, the defect information is written on the reserved 8th~11th bytes of the request sense data and returned to the host.

For example, the numbers of sectors (written sector number) on which data was recorded according to a write command may be written on the 8th and 9th bytes and consecutive defect sector numbers may be written on the 10th and 11th bytes. The consecutive defect sector number is returned to prevent the host from generating and providing a command for writing data on the same consecutive defect sector. If a block with a high possibility of defect is encountered during writing, the microcomputer regards the written sector number and 16 sectors of the defective block as the consecutive defect sector number and returns the same to the host. This is because, if a defective sector is encounter during writing, a whole block to which the defective sector belongs is considered defective and listed on the SDL.

Upon reception of the request sense data with the defect information written thereon from the microcomputer, the host provides a new write command referring to the written sector number and the defect sector number. Particularly, utilizing the defect information from the microcomputer, the new command includes the LBA of the first sector number of a next good block subsequent to a defective sector or block. Accordingly, upon reception of the new write command from the host, the microcomputer in the R/P device continues writing the data starting from a designated position, i.e. from the good block subsequent the defective block.

The R/P device and the host repeats the aforementioned process each time a defective area is encountered during writing of data on the optical disk. If the write command from the host terminates normally (step 610), i.e. if no defective block is encountered during the execution of the write command, the microcomputer returns a good state to the host (step 611). By a predetermined protocol or signal rather than a command, the host may request the present status of writing during the writing of data. Thus, upon the generating of the signal, the R/P device would provide the requested information to the host. If there is no protocol, the microcomputer provides defect information on the writing to the host after the write command terminates.

When writing of one file is completed (step 612), the host writes out an ICB, indicating a starting position and size of the file in an UDF file system, with reference to the defect information provided on the optical disk in the R/P device (step 613). An example ICB of file 1 shown in FIG. 8A is written out as shown in FIG. 6C. Namely, the microcomputer writes file 1 starting from position 'A' for H number of sectors where a new defective block is encountered. The microcomputer then stops the write command, returns defective information to the host, receives a new write command from the host, and continues writing the data of file 1 starting from position 'G' for T number of sectors. Writing of file 1 would be completed after writing file 1 from position 'D' for P number of sectors, and from position 'E' for U number sectors by providing, in advance, information on the defective blocks sb1kA and sb1kB listed on the SDL.

Eventually, an ICB of file 1 is made divided into a subfile having a starting position 'A' and a size H, a subfile having a starting position 'G' and a size T, a subfile having a starting position 'D' and a size P, and a subfile having a starting position 'E' and a size U. Namely, the defective areas sb1kA, sb1kB, sb1kE present in the writing area of file 1 are not written on the ICB. As a result inconsistencies between the size of a written file and the size of an actual file and inconsistencies of the LSNs due to defective regions do not occur. As a result, mistakes made by the file manager due to such inconsistencies are also eliminated.

Figure 9:
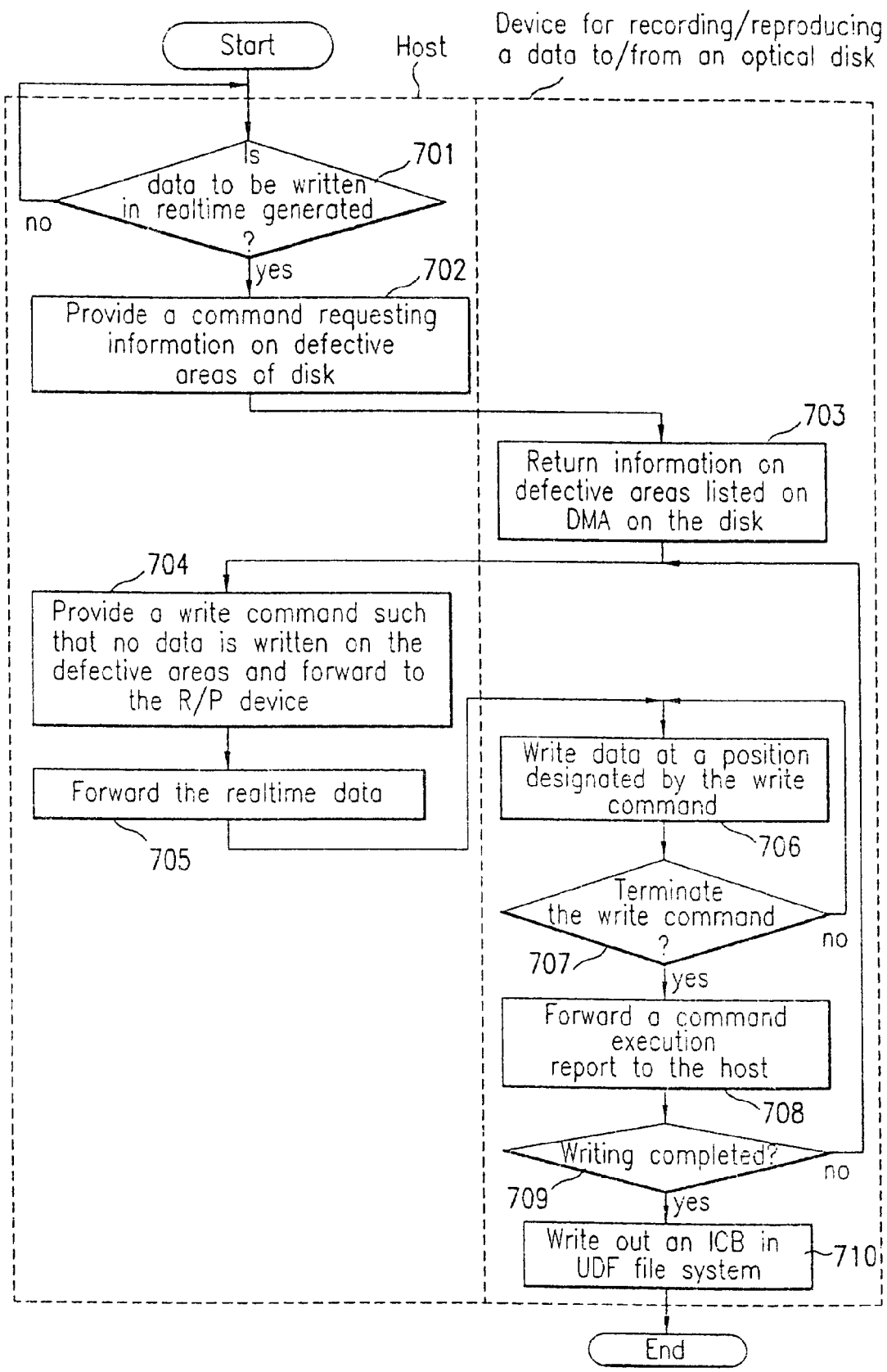
FIG. 9 is a flow chart showing writing on a newly encountered defective block as is in a method for real time R/P of data to/from an optical medium and a method for managing files in accordance with a first embodiment of the present invention.

FIG. 9 is a flowchart showing another method for real time R/P of data to/from an optical medium by writing on a defective block as is upon encountering a defective block not listed on the SDL during writing in response to a write command. Explanations on steps 701 to 705 will be omitted as the steps are identical to the steps 501 to 505 in FIG. 5.

According to this method, even if a defective block with a high possibility of error occurrence is encountered during writing of data at a position designated by the write command, the data is simply written on the defective block as is (step 706). Shown in FIG. 10A, the data continues to be written on newly encountered defective blocks as is until the execution of the write command from the host terminates. Thus, when the write command terminates after the writing the data for 'M' sectors (step 707), the R/P device provides a command execution report of good state to the host (step 708). Although a good state is returned to the host, the microcomputer adds the information on defective blocks in the SDL to be returned to the host during the next writing.

Similar to the previous methods, by a predetermined protocol or signal rather than a command, the host may make requests for the present status of writing during the writing of data. Thus, upon the generating of the signal, the R/P device would provide the requested information to the host. If there is no protocol, the microcomputer provides the defect information on writing to the host after the write command has been executed.

If a request from a user or writing of a file is not completed, the host continues to generate and provide a write command. As defective blocks sb1kA and sb1kB of FIG. 10A would be listed on the SDL, the write command is generated such that data is not written on defective blocks sb1kA and sb1kB. For example, the host may generate a write command to write the data starting from position 'D' for P number of sectors excluding the defective block sb1kA and forward the write command to the R/P device together with relevant data. The write command may be a command for writing data starting from the 'D' position for P sectors or a command for writing data starting from any empty area of an existing file. Nevertheless, the write command excludes the defective area, resulting in a fragmentation of the write command due to the defective area.

The microcomputer provides a command execution report to the host each time the write command terminates. Most of the command execution report would indicate a good state since defective areas are excluded when the write command is generated from the host.

Upon completion of the writing of the file (step 709), the host writes an ICB, as shown in FIG. 6C, representing a starting position and a size of a file in an UDF file system on an optical disk (step 710) with reference to the positional information on the returned defective areas. Rather than representing the size of a file as 'N' or 'N-L' regardless of the defective areas as in the related art, in the present invention, a number of sectors representing the size of a file is written separated by defective blocks if the defective blocks are listed on the SDL. If there are no defective blocks listed on the SDL within two or more consecutive write commands, the consecutive write commands are considered to be continuous. The sectors corresponding to the continuous write commands are added to be written as the consecutive write commands.

Sectors Q, R, S shown in FIG. 10A are examples of such continuous write commands. If file 1 in FIG. 10A is taken as an example, an ICB of file 1 is written by dividing into a subfile having a starting position 'A' and a size M, a subfile having a starting position 'D' and a size P, a subfile having a starting position 'E' and a size 'Q+R+S'. The defective areas sb1kA and sb1kB present in the writing area of file 1 are not written on the ICB. FIG. 10B shows the ICB for file 1 of FIG. 10A. As a result, inconsistencies between the size of a written file and the size of an actual file and inconsistencies of the LSNs due to defective regions do not occur. As a result, mistakes made by the file manager due to such inconsistencies are also eliminated.

Second Embodiment

Figure 11:
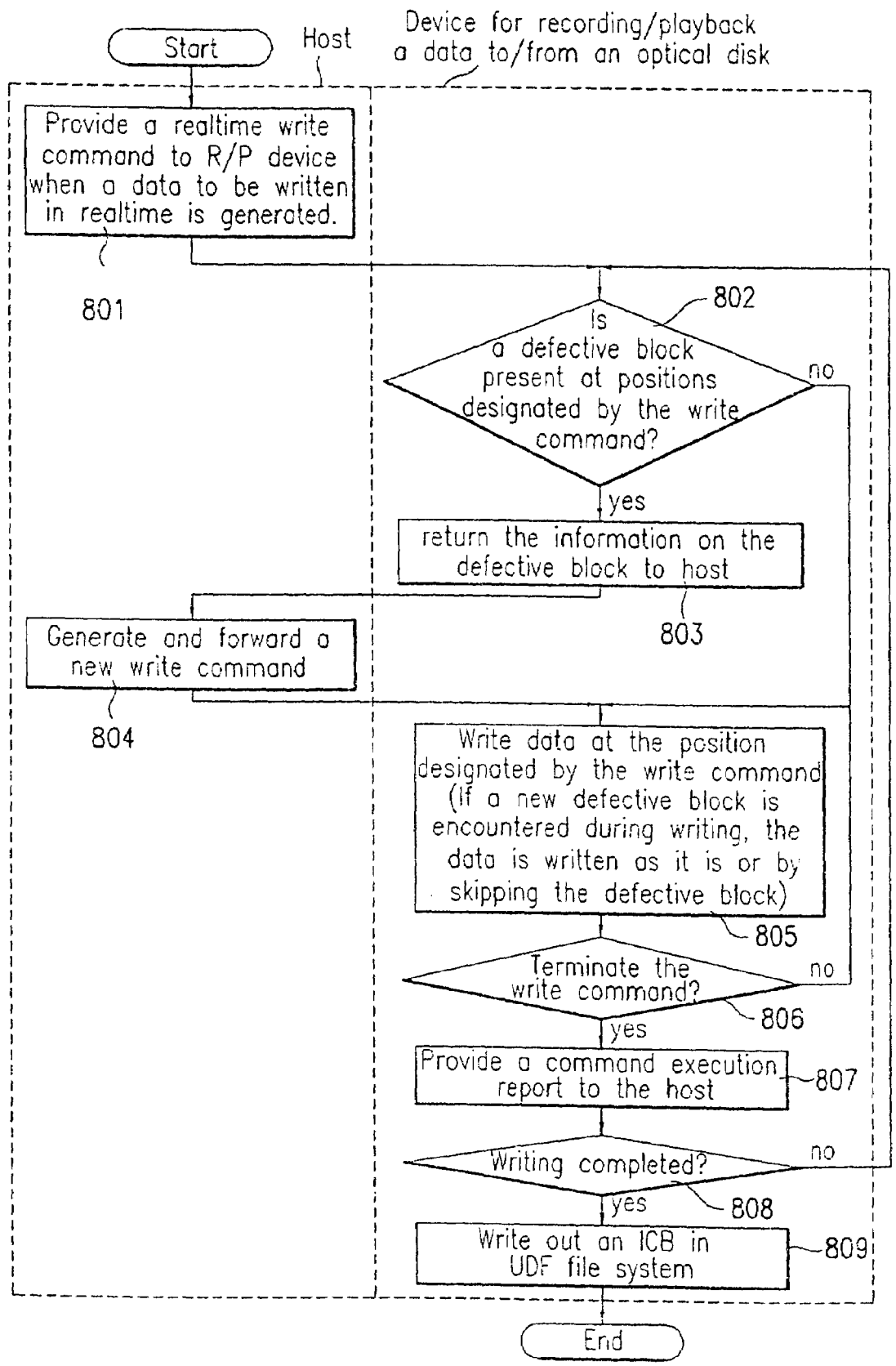
FIG. 11 illustrates a method for real time R/P of data to/from an optical medium and a method for managing files in accordance with a second preferred embodiment of the present invention.

FIG. 11 is a second embodiment of the present invention, in which a defective block listed on an SDL are returned to a host, and the host generates and transmits a real time write command to the R/P device if real time data is generated. Upon reception of the write command, the R/P device determines the presence of a defective block listed on the SDL in a writing area designated by the write command prior to writing the data. If a defective block is present, the R/P device returns positional information of the defective block to the host, and receives a new write command from the host to write the data. A file system is managed in units of the returned defective block.

When data to be written in real time is provided, the host provides the data to be written on the optical disk to the R/P device together with a command for controlling a real time recording (step 801). In order to manage files, the R/P device checks for the presence of defective blocks listed on the SDL before writing the data at a position designated by the write command (step 802). If at least one defective block is listed on the SDL, the positional information of the defective block is returned to the host (step 803).

Figure 12:
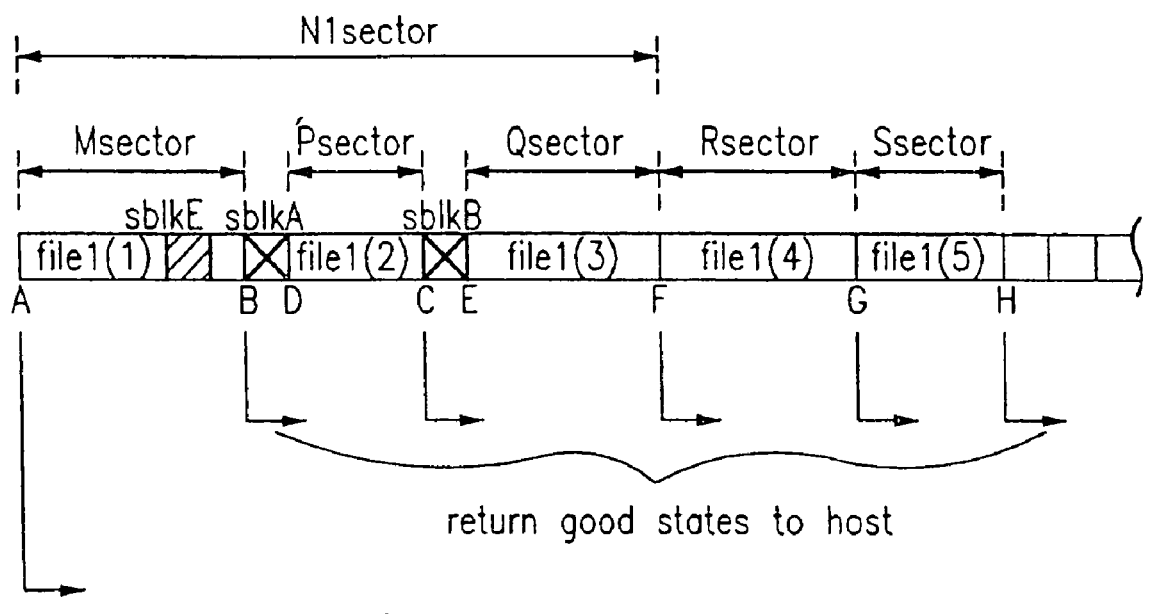
FIG. 12 illustrates a state in which a data is written by a method for real time recording of a data.

For example, referring to FIG. 12, a real time write command for writing the data of file 1 starts from position 'A' for N1 sectors. The microcomputer checks for the presence of any defective blocks listed on the SDL in N1 sectors. As blocks sb1kA and sb1kB are listed on the SDL, the microcomputer returns the positional information on these defective blocks to the host. Although the positional information can be returned by numerous methods, in the preferred embodiment, the positional information of the defective blocks is provided to the host using a request sense data as explained with reference to FIG. 6B or 8B.

Namely, as shown in FIG. 12, upon reception of a real time write command for writing data on N1 sector area starting from position 'A', the microcomputer in the R/P device checks for the presence of defective block listed on the SDL in the N1 sectors. If defective blocks are present, the device returns a check condition status (CHECK CONDITION status) to the host. Upon reception of the check condition status, the host provides the request sense command to the R/P device requesting an error code. Thus, the R/P device returns to the host the request sense data as shown in FIG. 6B or 8B. The R/P device may return the positional information of the first defective block sb1kA of N1 sector as shown in FIG. 8B or return the positional information on all defective blocks sb1kA and sb1kB within the area designated by a write command as shown in FIG. 6B.

Accordingly, upon reception of the request sense data having the positional information of defective blocks from the microcomputer, the host generates a new write command, i.e. a command such that data is not written on defective blocks. The new write command is forwarded to the R/P device (step 804). The write command may be a command for writing data starting from the 'D' position for P sectors or a command for writing data starting from any empty area of an existing file. As the host may provide numerous write commands for one file, the write command for one file would be divided.

If the new write command is a command for writing data starting from position 'A' for M sectors as shown in FIG. 12, the R/P device begins to write data starting from position 'A' (step 805). If a new defective block such as sb1kE, not listed on the SDL, is encountered, the methods explained with reference to the first embodiment would be similarly applicable to the second embodiment. Thus, the newly encountered defective block may be skipped as shown in FIGS. 5 and 7, or the data may be written on the defective block as shown in FIG. 9

When the write command is completed, i.e. the data is written for M sectors (step 806), the microcomputer provides a command execution report to the host (step 807). Also, by a predetermined protocol or signal rather than a command, the host may make requests for the present status of writing during the writing of data. Thus, upon the generating of the signal, the R/P device would provide the requested information to the host. If there is no protocol, the R/P device provides defect information on writing to the host after the execution of the write command terminates.

Using file 1 of FIG. 12 as an example, after completing the write command for writing data on M sectors, the writing of one file is not finished. Thus, the host continues to provide a write command to the R/P device. Because the host would have information on the defective blocks sb1kA and sb1kB listed on the SDL, the host provides a new writing command such that data is not written on defective blocks sb1kA and sb1kB. That is, a command for writing data starting from position 'D' for P sectors may be provided. If there is no defective block in a writing command as the R sector or the S sector, a good state is returned to the host each time the write command is finished.

Upon completion of writing a file according to the aforementioned process (step 808), the host writes an ICB indicating a starting position and the size of the file in a UDF file system on the optical disk as shown in FIG. 10B with reference to the returned positional information of the defective blocks (step 809). An ICB of file 1 in FIG. 12 is written by dividing into a subfile having a starting position 'A' and a size M, a subfile having a starting position 'D' and a size P, and a subfile having a starting position 'E' and a size 'Q+R+S'. The defective areas sb1kA and sb1kB within a writing area of the file 1 is not written on the ICB. If a new defective block sb1kE is encountered and skipped, the new defective block sb1kE also is not written on the ICB.

As a result, inconsistencies between the size of a written file and the size of an actual file, and inconsistencies of the LSNs due to defective regions do not occur. As a result, mistakes made by the file manager due to such inconsistencies are also eliminated. Moreover, such ICB can be made while maintaining the existing UDF file system. Even in the existing system, one file is often written by shifting to empty areas rather than in succession, resulting in fragmentation of the file. Similarly, the ICB simply fragmentizes one file. The present invention regards the defective areas as skipped areas caused by shifting of areas in making the ICB, thereby creating no conflicts with an existing file system. Also, as the defective areas maintain the LSN without being written on the ICB, the defective area can be used during writing by linear replacement. By replacing the defective blocks encountered during writing with a spare block in the spare area, linear replacement allows use of the whole user area of the disk. Thus, utilization efficiency of the disk can be improved. Since the host receives information on defects of the disk during a state in which disk architecture is not known in making a real time recording control, a load on the host can be reduced.

The present invention has been explained with reference to both a host and a device for recording/playback of data to/from an optical disk. When only a R/P device is provided without a host, such as a disk player, a microcomputer in the R/P device directly controls the above procedure. Thus, having the information on defective areas written on the DMAs, the microcomputer in the R/P device reads the information on the defective blocks and the information on a present file architecture to provide a write command. Namely, the write command would write data on the present file architecture without writing the data on defective areas during real time recording. In such a case, the command may differ from a command provided to the host.

The ICB write out is also made by the microcomputer, wherein a sector number representing a file size is written, divided by the defective blocks, and adding sectors numbers in the write commands for two or more continuous write commands, as shown in FIG. 10B. On the other hand, during the playback of data from the optical disk, the host or a disk player provides a read command referring to the aforementioned file architecture, such that data will not be read from defective areas.

In sum, the method for real time R/P of data to/from an optical recording medium and a method for managing a file thereof according to the present invention have the following advantages. Because the host controls data writing by providing a signal to the R/P device requesting information on defective areas when a real time data is provided, the host can provide a write command such that data is not written on a defective area based upon the information on the defective area returned from the R/P device. Alternatively, because the host controls data writing by providing a write command to the R/P device upon which the R/P device returns information on defective areas, the host can provide a write command such that data is not written on a defective area based upon the information on the defective area is returned from the R/P device.

Moreover, in making a real time recording, there is no occurrence of a difference between an actual file size and a written file size or an inconsistency between LSNs. Because a defective area remains as an empty area on the ICB while the defective area retains an LSN, efficiency can be improved by allowing use of the defective area in the next linear replacement. Furthermore, since an ICB is written by regarding a defective area as a skipped area caused by shifting, no conflict with an existing file system is occurs, thereby maintaining interchangeability with an existing UDF file system as is. Finally, since the host receives defect information in a state when disk architecture is unknown during real time recording control, load on the host can be reduced.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

We claim:

1. A method of writing or reproducing data to/from a recording medium, the recording medium including a DMA (defect management area) including defect management information for managing a defective block, the method comprising:

determining whether data to be written is a real time data;

performing a writing operation of data without replacing a defective block with a replacement block within a spare area of the recording medium, when the data is the real time data;

generating file information based on position information of the defective block during the writing of the real time data or after completing the writing of the real time data; and writing the file information on a specific area of the recording medium, wherein the file information includes size information for indicating a size of the real time data written in each data area divided by one or more defective blocks, and location information for indicating a location of each divided data area.

2. The method of claim 1, wherein the performing step further includes a step of reading the position information of the defective block listed in the defect management information of the DMA, prior to the writing operation.

3. The method of claim 2, wherein the reading step comprises:

reading position information of the defective block listed in a SDL (Secondary Defect List) of the defective management information.

4. The method of claim 3, wherein the reading step reads a first sector number of each defective block listed in the SDL.

5. The method of claim 1, the step of performing the writing operation comprising:

skipping the defective block listed in the defect management information of the DMA; and writing the data on next normal blocks following the defective block.

6. The method of claim 5, the step of performing the writing operation further comprising:

skipping a new defective block not listed in the defect management information; and writing the data on next normal blocks following the new defective block.

7. An apparatus for writing or reproducing a data to/from a recording medium, the recording medium includes a DMA (Defect Management Area) including defect management information for managing a defective area, comprising:

a pick-up unit configured to write or reproduce data on or from the recording medium; and a control circuit, operably coupled to the pick-up unit, configured to determine whether data to be written is a real time data, control the pick-up unit to write the data on the recording medium without replacing a defective block with a replacement block within a spare area located of the recording medium, when the data is the real time data, and generate file information based on position information of the defective block during the writing of the real time data or after completing the writing of the real time data, control the pick-up unit to write the file information on a specific area of the recording medium, wherein the file information includes size information for indicating a size of the real time data written in each data area divided by one or more defective blocks, and location information for indicating a location of each divided data area.

8. The apparatus of claim 7, wherein the pick-up unit is configured to read the position information of the defective block listed in the defective management information of the DMA, and the control circuit is further configured to identify the defective block based on the position information and control the pickup unit to not replace the identified defective block with the replacement block.

9. The method of claim 8, wherein the pick-up unit is configured to read position information of the defective block listed in a SDL (Secondary Defect List).

10. The method of claim 9, wherein the pick-up unit is configured to read a first sector number of the defective block listed in the SDL.

11. The apparatus of claim 7, wherein the control circuit is configured to control the pick-up unit to skip the defective block listed in the defect management information and to write the data on next normal blocks following the defective block.

12. The apparatus of claim 11, wherein the control circuit is further configured to control the pick-up unit to skip a new defective block not listed in the defect management information and to write the data on next normal blocks following the new defective block.

13. The apparatus of claim 7, further comprising:

a data processor configured to process the data read or to be recorded by the pick-up unit.

14. The apparatus of claim 13, further comprising:

an interface circuit configured to communicate with an external entity; and a host device coupled to the interface circuit to send a write command and to receive a report about the writing operation via the interface circuit.

15. A recording medium, comprising:

a defect management area (DMA) including defect management information for managing a defective block;

a spare area for replacing the defective block, the spare area being preceded by the defect management area;

a data area in which real time data or non-real time data is recorded, the data area being preceded and/or followed by the spare area, wherein the real time data is recorded on the data area without replacing the defective block with a replacement block within the spare area; and a file information area for storing file information, wherein the file information includes size information for indicating a size of the real time data written in each data area divided by one or more defective blocks, and location information for indicating a location of each divided data areas, wherein the file information is generated based on position information of the defective block during the writing of the real time data or after completing the writing of the real time data.

16. The recording medium of claim 15, wherein the defect management area includes the position information of the defective block listed in the defect management information of the DMA.

17. The recording medium of claim 16, wherein the position information of the defective block is listed in a SDL (Secondary Defect List).

18. The recording medium of claim 17, wherein the position information of the defective block is a first sector number of each defective block.

19. The recording medium of claim 15, wherein the real time data is recorded on next normal blocks following the defective block listed in the SDL and/or a new defective block not listed in the defect management area.

* * * * *